United States Patent
Bowser et al.

(10) Patent No.: US 6,943,793 B2
(45) Date of Patent: Sep. 13, 2005

(54) METHOD AND APPARATUS FOR DISPLAYING RESOURCE INFORMATION

(75) Inventors: Roderick Clint Bowser, Austin, TX (US); Brian Douglas Brandenburg, Wake Forest, NC (US); Robert P. Lowe, Austin, TX (US); Darren Kelly Upton, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 10/703,020

(22) Filed: Nov. 6, 2003

(65) Prior Publication Data

US 2005/0099422 A1 May 12, 2005

(51) Int. Cl.[7] ............................. G09G 3/20; G06T 15/00
(52) U.S. Cl. ................................................. 345/440.2
(58) Field of Search .............................. 715/835–837, 715/810; 345/440, 440.2; 700/291

(56) References Cited

U.S. PATENT DOCUMENTS

| | | | |
|---|---|---|---|
| 5,528,735 A | 6/1996 | Strasnick et al. | 395/127 |
| 5,555,354 A | 9/1996 | Strasnick et al. | 395/127 |
| 5,909,217 A | 6/1999 | Bereiter | 345/357 |
| 6,222,540 B1 * | 4/2001 | Sacerdoti | 345/581 |
| 6,707,454 B1 * | 3/2004 | Barg et al. | 345/440 |

* cited by examiner

Primary Examiner—Richard Hjerpe
Assistant Examiner—Michelle K. Lay
(74) Attorney, Agent, or Firm—Duke W. Yee; Jeffrey S. LaBaw

(57) ABSTRACT

A method, apparatus, and computer instructions for presenting resource information. A plurality of three-dimensional elements in a view is displayed in which each element represents a resource in a network data processing system. Additional information regarding a parameter associated with the element is displayed in response to a user input interacting with an element from the plurality of three-dimensional elements.

19 Claims, 7 Drawing Sheets

METHOD AND APPARATUS FOR DISPLAYING RESOURCE INFORMATION

BACKGROUND OF THE INVENTION

1. Technical Field

The present invention relates generally to an improved data processing system, and in particular, to a method and apparatus for processing data. Still more particularly, the present invention provides a method, apparatus, and computer instructions for displaying information in a data processing system.

2. Description of Related Art

Businesses employ networks and enterprise systems having a vast array of resources. These resources include, for example, servers, routers, work stations, terminals, storage libraries, and other types of devices used in providing data processing system capabilities. Currently, viewing large numbers of resources such as work stations or servers in a server farm may be viewed by scrolling through names in a table. This type of presentation may be in a window with a scroll box allowing the user to scroll up and down through names of servers or other types of devices that are being viewed. Within this table, the different resources may be presented in different orders, such as in the order of name or usage.

The drawback of this type of resource information presentation is that a user is unable to view the entire system at one time. A user may only see part of the system at any one time. Further, requesting each work station or server as an icon helps provide a view of the entire system one piece at a time. Obtaining useful information from this type of display, however, is difficult. A user may move a pointer to hover over an icon to display additional text. This type of presentation of information with these steps is difficult for users with disabilities to use.

Therefore, it would be advantageous to have an improved method, apparatus, and computer instructions for presenting resource information for a network data processing system.

SUMMARY OF THE INVENTION

The present invention provides a method, apparatus, and computer instructions for presenting resource information. A plurality of three-dimensional elements in a view is displayed in which each element represents a resource in a network data processing system. Additional information regarding a parameter associated with the element is displayed in response to a user input interacting with an element from the plurality of three-dimensional elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
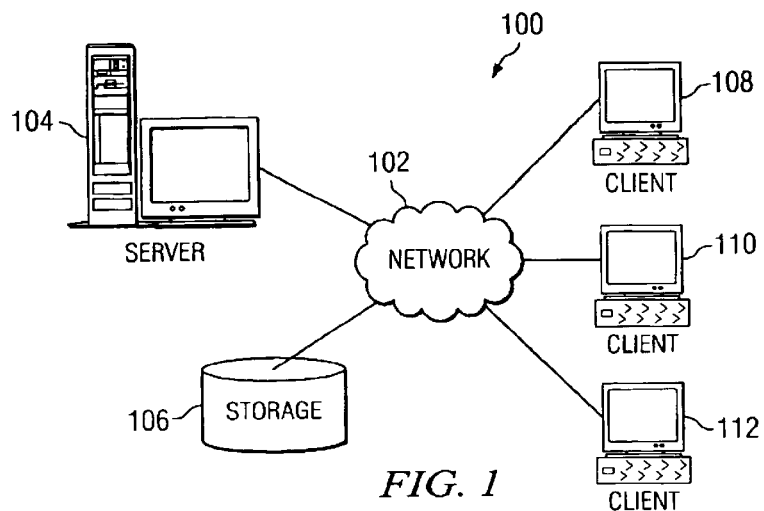
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
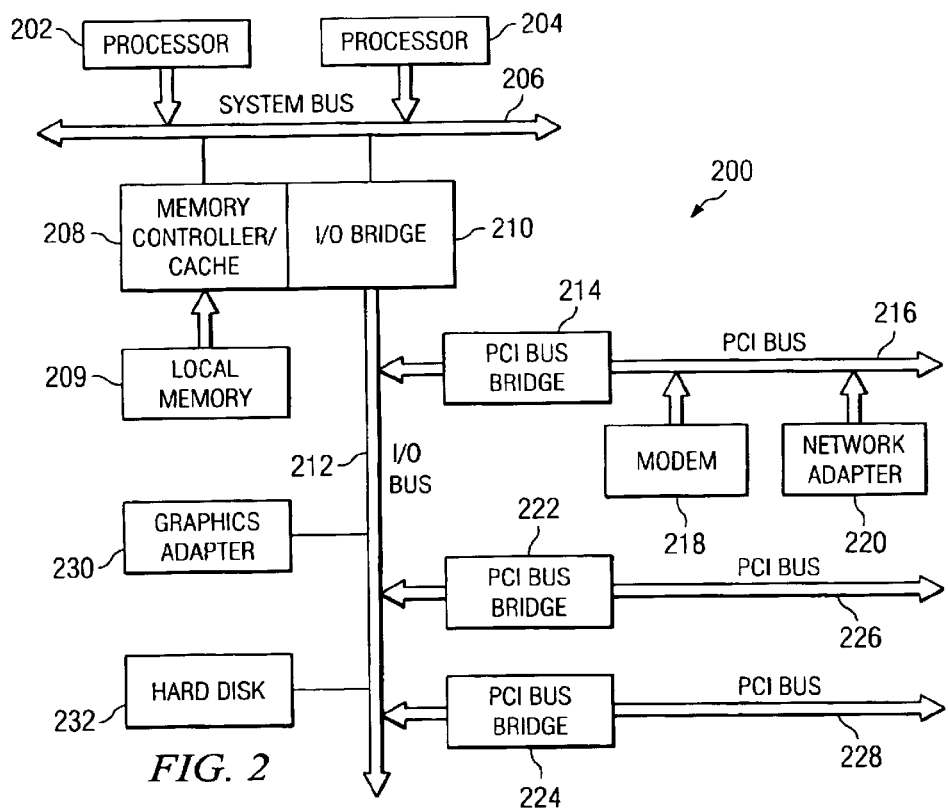
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
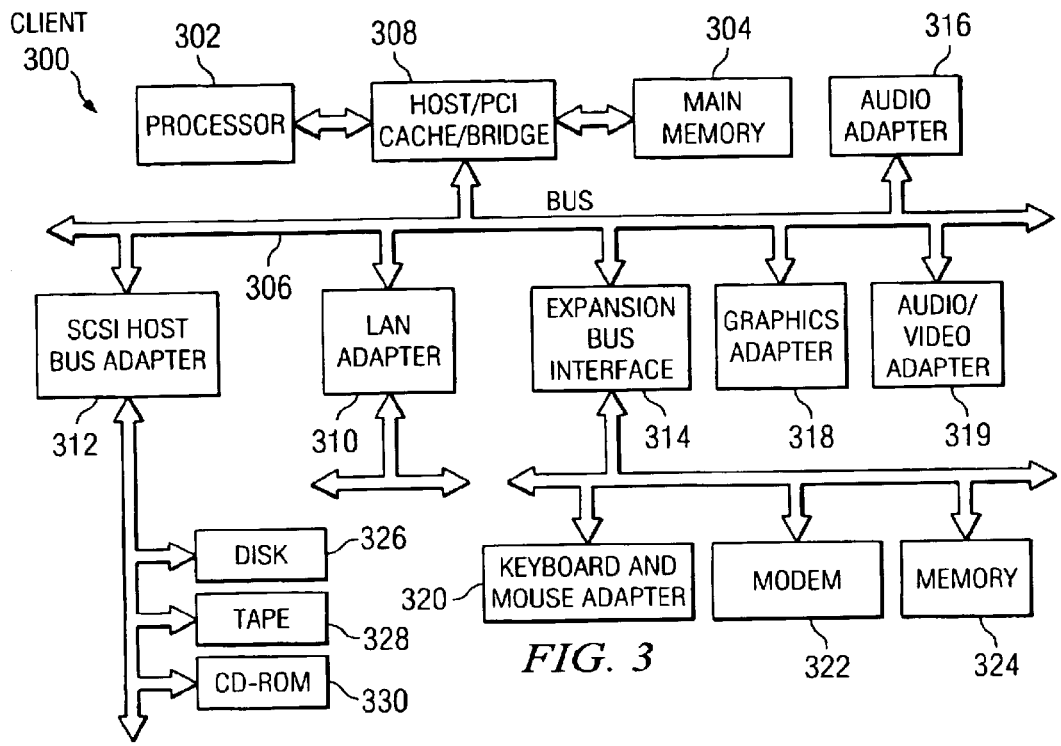
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for displaying resource information within a network data processing system, such as network data processing system 100 in FIG. 1. The mechanism of the present invention provides a graphical display of resource information that is especially useful for systems with large numbers of resources, such as work stations or servers. This mechanism allows for presenting many resources within a small display area.

Further, this mechanism allows for selecting a particular area and obtaining a larger picture or view of the selected area in which to view and select graphics to obtain additional information about associated resources. Also, this type of presentation and selection mechanism provides for a gain in accessibility for disabled users.

The mechanism of the present invention displays a window or portal panel containing icons segmented into user-defined groups. These groups may be, for example, work stations, servers, storage libraries, and routers. Alternatively, the groups may be divided up into particular types of work stations, such as work stations located in particular buildings or work stations assigned to particular business groups. Selection of one of these groups results in display of a three-dimensional scale element that may be viewed and manipulated by the user for additional information.

Figure 4:
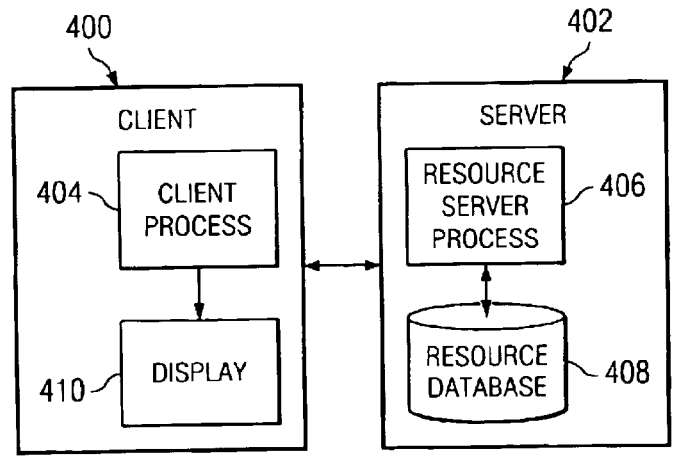
FIG. 4 is a diagram illustrating components used in providing for a graphical display of resource information in accordance with a preferred embodiment of the present invention.

Turning now to FIG. 4, a diagram illustrating components used in providing for a graphical display of resource information is depicted in accordance with a preferred embodiment of the present invention. In this example, a user may view resource information for a network data processing system through client 400. This information is obtained from server 402 in the illustrative examples. Client 400 includes client process 404, which may request the resource information from resource server process 406.

Resource server process 406 obtains information regarding various metrics that are of interest and stores that information in resource database 408. This information may include, for example, an identification of work stations or servers. This information may be divided into types of servers, such as Web servers, database servers, and other types of servers.

Metrics that may be gathered for these servers include, for example, the operational level of a particular server, such as whether a server is operating in a normal mode, a warning mode, or a critical mode. Further, other metrics may include, for example, the capacity or amount of processing being performed by a particular server. Some other metrics include for example, TCP/IP parameters including a high ping or response level and retransmission of segments. Another metric that may be used includes low available memory or high paging of data. Stopped or failed services are additional metrics. Metrics also include physical disk measurements that indicate a high percentage of disk time, a high transfer rate, a slow physical drive, and a high reading of bytes per second. Logical disk metrics include, for example, low disk space, amount of fragmentation, and slow logical drive response. A high print job error rate for a printer is yet another example of a metric that may be used.

Client process 404 receives this information from resource server process 406. This information is displayed in display 410 to the user in a graphical manner that allows for viewing the entire system of servers. Additionally, the display also allows the user to select particular servers, displayed in a graphical manner, to obtain more information for that particular server.

Moreover, the selection of a particular server also may provide a display of controls to adjust parameters on that server depending on the implementation. Although in this example the process used to obtain and display resource information is located in a client separate from server 402, that process and display may be located at server 402 depending on the particular implementation.

Turning now to FIGS. 5A–5D, windows in a graphical user interface for presenting resource information are depicted in accordance with a preferred embodiment of the present invention. The windows in FIGS. 5A–5D are illustrative examples of information that may be presented as display 410 within client 400 in FIG. 4.

Figure 5A:
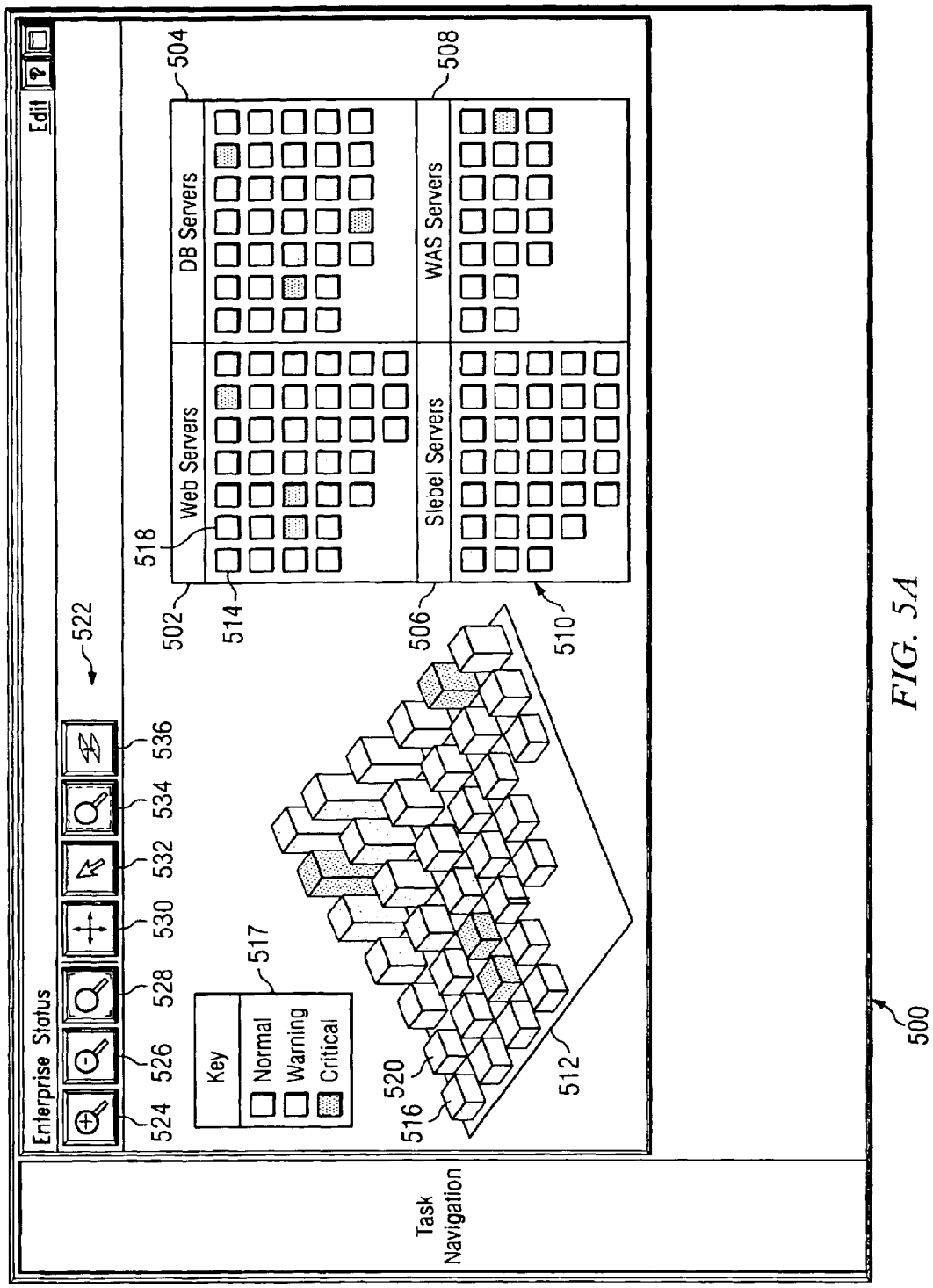
FIGS. 5A–5D are windows in a graphical user interface for presenting resource information in accordance with a preferred embodiment of the present invention.

In FIG. 5A, window 500 provides a summary status view of information for a set of servers. In this example, user-defined groups for presentation are Web servers 502, database (DB) servers 504, Siebel servers 506, and WAS servers 508 within section 510. In this group, section 510 is divided into quadrants of servers. Selection of one of these quadrants results in a three-dimensional display in section 512 of the servers in the selected quadrant. Window 500 illustrates all of the servers in a network data processing system, such as network data processing system 100 in FIG. 1. Of course, other numbers of groups may be defined and images in section 510 may be made smaller to accommodate additional groups. Other types of grouping for section 510 may include, for example, storage libraries or client workstations. The groupings in the quadrants may be made in many different ways in addition to the grouping illustrated in section 510. For example, the servers in section 510 may be grouped by location of the servers or business groups assigned to or associated with the servers. Further, these groups may be of a heterogeneous nature. For example, section 510 may also show storage libraries and routers in addition to server groups.

In this illustrative example, Web servers 502 have been selected by the user and are presented in a three-dimensional form in section 512. The elements in section 512 correspond to those within Web servers 502. For example, element 514 in Web servers 502 corresponds to three-dimensional element 516 in section 512. In this example, key table 517 is used to color code the different elements to show the state of normal, warning, and critical in both sections 512 and 514.

Element 518 in Web servers 502 corresponds to element 520 in section 512. Further, in addition to the color coding provided by key table 517, three-dimensional elements within section 512 are presented in a manner to illustrate relative states between the different servers in Web servers 502. Window 500 also provides for different types of controls to manipulate the presentation of data on toolbar 522. For example, toolbar 522 includes zoom in button 524 and zoom out button 526, zoom to fit button 528, pan button 530, select items button 532, selective magnification button 534, and level button 536.

Zoom in button 524 and zoom out button 526 allow a user to zoom in or zoom out from a display, such as that of the three dimensional elements section 512. A user may move a pointer to the display and use the selected function to either zoom in to obtain a closer view or zoom out to obtain a farther view of the display. Zoom to fit button 528 allows a user selecting the function to zoom the image to fit the available space.

Pan button 530 allows a user to move the image area in the display with a pointing device. Select items button 532 allows a user to select items with a pointing device for manipulation. Selective magnification button 524 provides a function for a user to select a section of the display for magnification. The area selected is magnified to fit window 500 or a section in window 500. Level button 536 allows a user to go up or down in levels of detail.

Figure 5B:
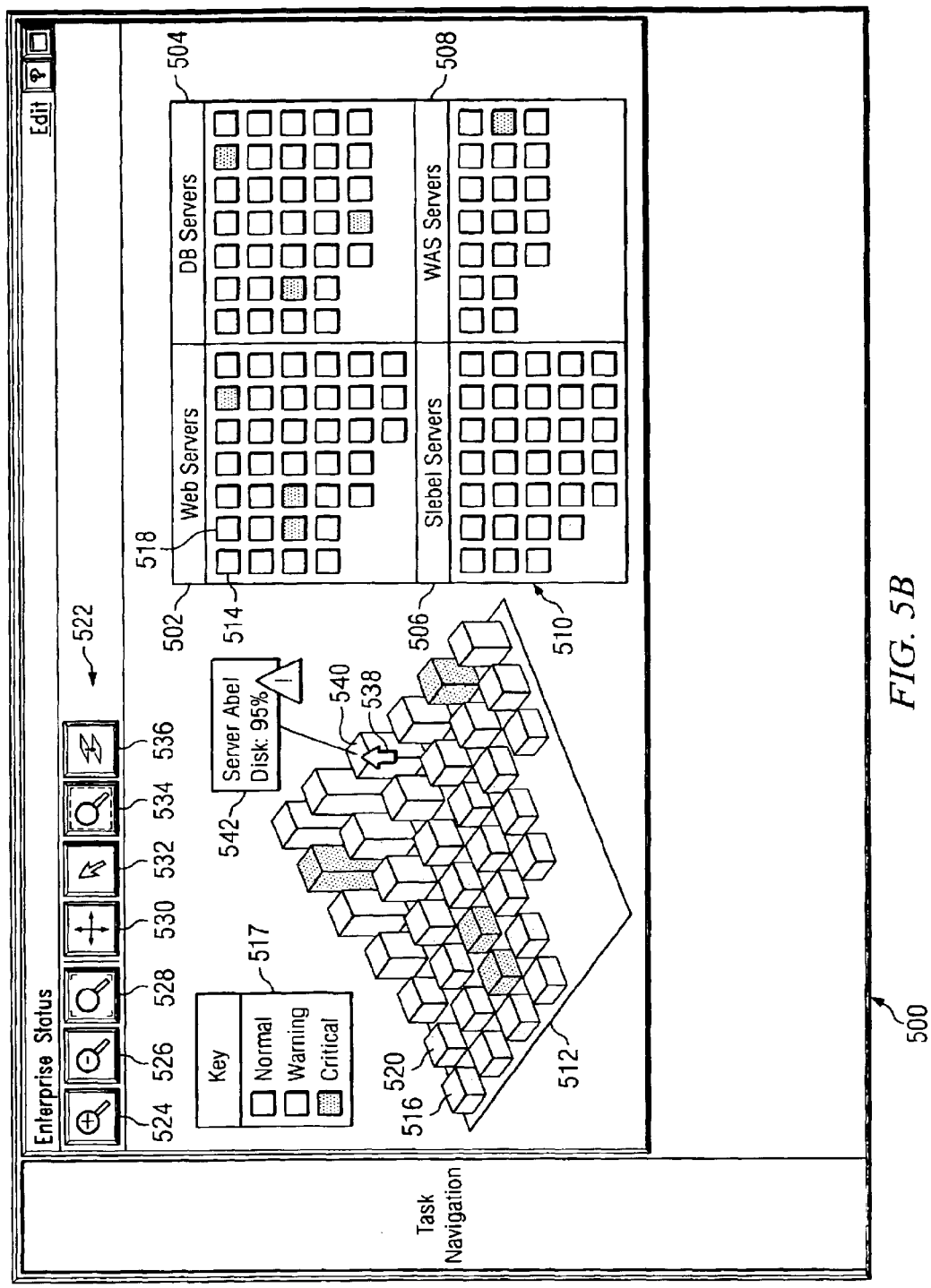

In FIG. 5B, pointer 538 is moved to hover over three-dimensional element 540. Hover means that the pointer stays over a particular area for some selected period of time. This hovering results in label 542 being displayed. This label is for the resource represented by three-dimensional element 540 as well as affected metrics. In this example, label 542 indicates that a server named "Abel" has a disk that is 95% full. Selection of element 540 may be made to show more details with respect to this particular resource.

Figure 5C:
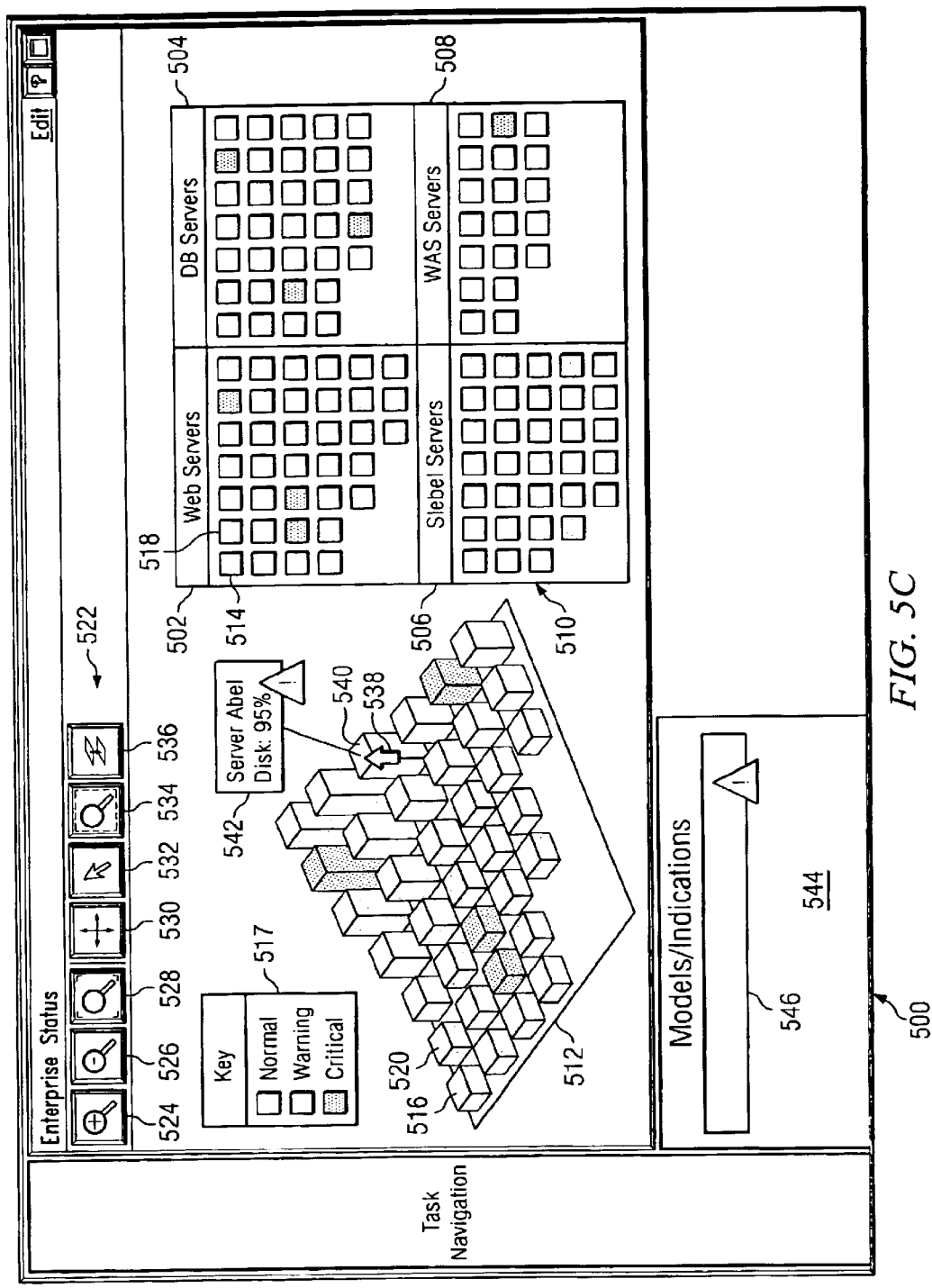

In FIG. 5C, a selection of element 540 has been made by the user, resulting in section 544 being displayed. This section provides for a display of a metric table containing all indications or parameters running on the affected model with the indication being highlighted. An indication is a metric of a resource. The resource may be, for example, how much room is present in a disk or how much space is being used in a disk. Another example of an indication is how busy a processor is at a given time. In this example, indication 546 is a representation of the processor usage on the selected resource.

Figure 5D:
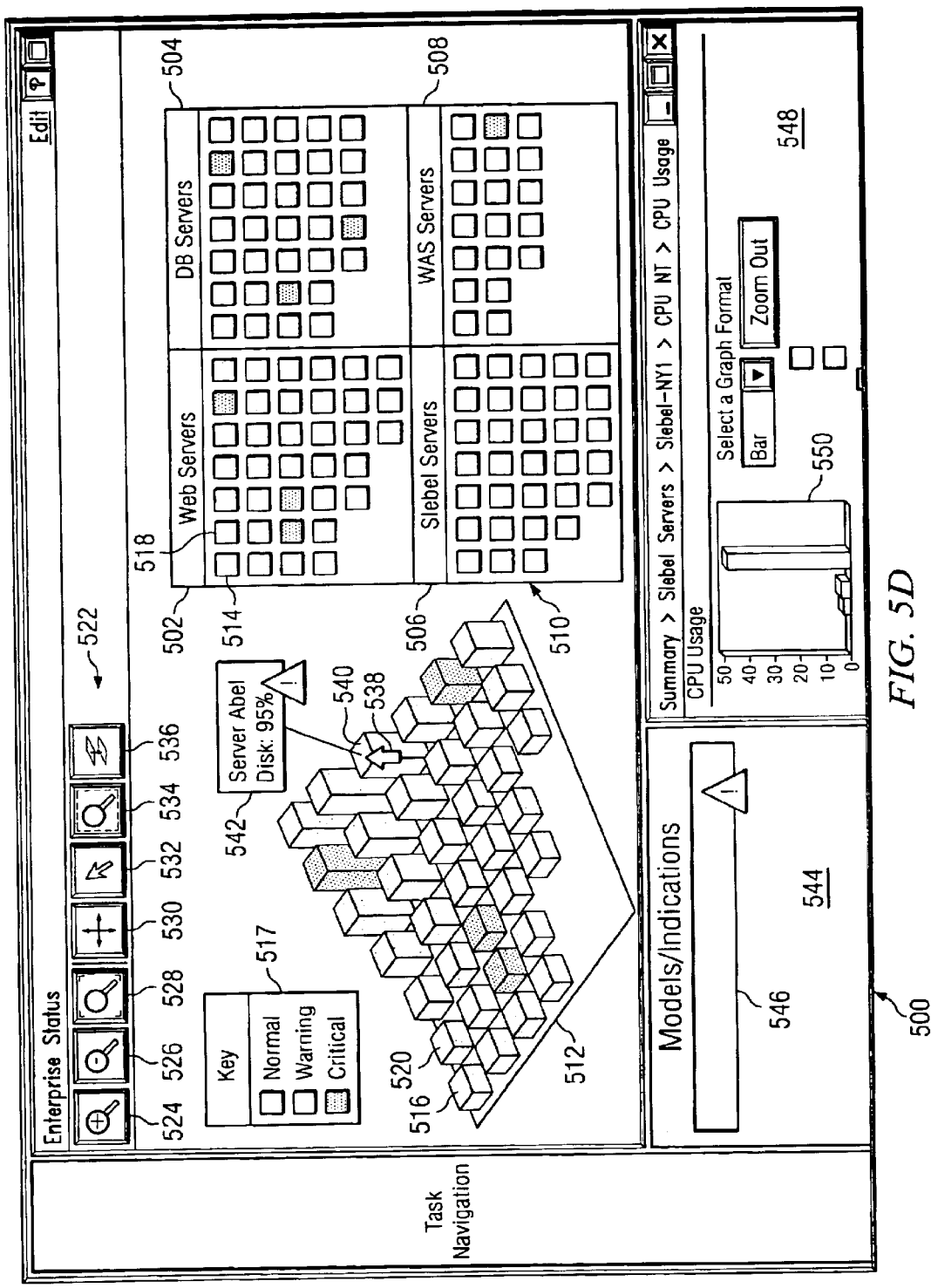

In FIG. 5D, the selection of indication 546 results in section 548 being displayed. This section provides chart 550, which displays processor or CPU usage within the selected resource. In this example, chart 550 shows processor usage for four different processors on the selected resource. Different tables and indications may be displayed depending on the particular resource selected.

The illustrative examples in FIGS. 5A–5D are not intended as limitations to the manner in which data may be presented to a user. These examples illustrate one way in which all resources in a network data processing system of a particular type or all resources in their entirety may be displayed to a user in a fashion that allows the user to view usage or availability of resources as a whole.

Figure 6:
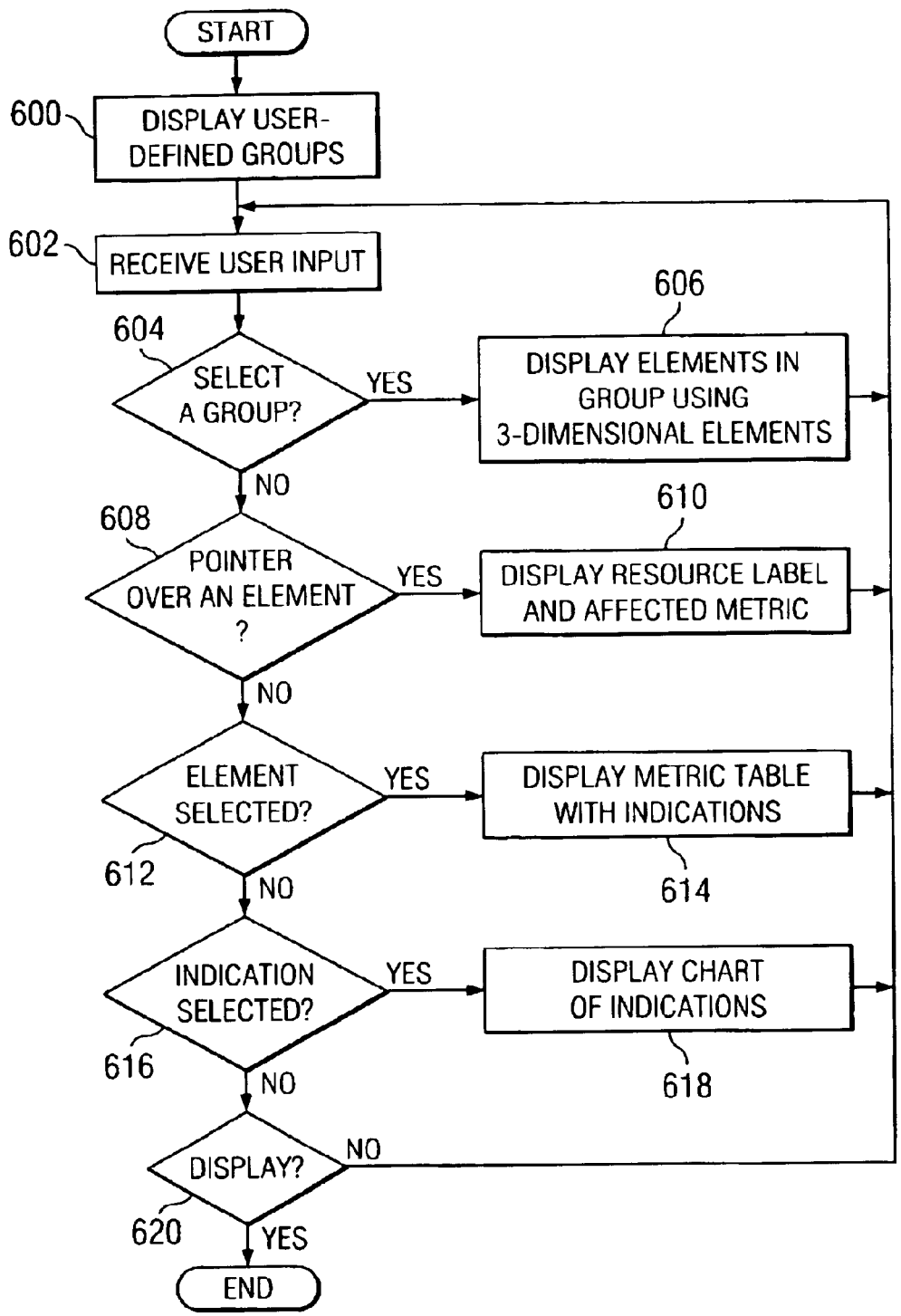
FIG. 6 is a flowchart of a process for presenting a graphical display of resource information in a network data process system in accordance with a preferred embodiment of the present invention.

Turning next to FIG. 6, a flowchart of a process for presenting a graphical display of resource information in a network data processing system is depicted in accordance with a preferred embodiment of the present invention. The process illustrated in FIG. 6 may be implemented in a data processing system, such as data processing system 200 in FIG. 2 or data processing system 300 in FIG. 3.

The process begins by displaying user-defined groups in a graphical user interface (step 600). This display may be presented using a window, such as window 500 in FIGS. 5A–5D. Thereafter, user input is received (step 602). A determination is made as to whether the user input is the selection of a group from the user-defined groups (step 604). If the selection is of a group, elements in the group are displayed using three-dimensional elements (step 606) with the process returning to step 602 to receive further user input.

If the user input in step 604 is not a selection of a group, a determination is made as to whether the user input moves a pointer over an element (step 608). If the user input moves the pointer over an element, the resource label and the affected metric for that particular resource represented by the element are displayed (step 610) with the process then returning to step 602.

On the other hand, if the user input in step 608 is not a movement of the pointer over an element, a determination is made as to whether the user input selects an element (step 612). If an element is selected, a metrics table with indications is displayed (step 614) with the process then returning to step 602. Otherwise, a determination is made as to whether the user input selects an indication (step 616).

If an indication is selected, a chart of the indication is displayed (step 618) with the process then returning to step 602. With reference again to step 616, if the user input does not select an indication, a determination is made as to whether the display is to be terminated (step 620). If the display is to be terminated, the process terminates. Otherwise, the process returns to step 602 as described above.

Thus, the present invention provides an improved method, apparatus, and computer instructions for displaying resource information within a network data processing system. The mechanism of the present invention provides for a graphical display that allows a user to view the entire system at one time, rather than only part of a system. The mechanism of the present invention provides for a window containing icons segmented or divided into user-defined groups. Selection of a group presents a three-dimensional scale image that may be viewed and manipulated for additional information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for presenting resource information, the method comprising:

displaying a set of user defined groups, wherein a user defined group within the set of user defined groups contains a set of two-dimensional elements and each two dimensional element represents a resource in a network data processing system;

responsive to a selection of the user defined group, displaying a three dimensional view of the two-dimensional elements from the user defined group to form a plurality of three dimensional elements, wherein a three-dimensional element within the plurality of three-dimensional elements visually conveys information about an associated metric for resource represented by the three-dimensional element; and responsive to a user input interacting with the three-dimensional element, displaying additional information regarding the three-dimensional element.

2. The method of claim 1, wherein the additional information is for another metric associated with the three-dimensional element.

3. The method of claim 1, wherein the user input is a movement of a pointer over the three-dimensional element and wherein the additional information is displayed as a label with text identifying a metric associated with the three-dimensional element.

4. The method of claim 1, wherein the user input is a selection of the three-dimensional element and wherein the additional information is a table containing an indication.

5. The method of claim 1, wherein the plurality of three-dimensional elements are a plurality of bars.

6. The method of claim 1, wherein the plurality of three-dimensional elements are color coded to provide information on a selected metric.

7. A data processing system for presenting resource information, the data processing system comprising:

a bus system;

a communications unit connected to the bus system;

a memory connected to the bus system, wherein the memory includes a set of instructions; and a processing unit connected to the bus system, wherein the processing unit executes the set of instructions to display a set of user defined groups, wherein a user defined group within the set of user defined groups contains a set of two-dimensional elements and each two dimensional element represents a resource in a network data processing system; display a three dimensional view of the two-dimensional elements from a group to form a plurality of three dimensional elements in response to a selection of the group from the groups of two-dimensional elements, wherein a three-dimensional element within the plurality of three-dimensional elements visually conveys information about an associated metric for resource represented by the three-dimensional element; and display additional information regarding the three-dimensional element in response to a user input interacting with the three-dimensional element.

8. A data processing system for presenting resource information, the data processing system comprising:

first displaying means for displaying a set of user defined groups, wherein a user defined group within the set of user defined groups contains a set of two-dimensional elements and each two dimensional element represents a resource in a network data processing system;

second displaying means, responsive to a selection of a group from the groups of two-dimensional elements, for displaying a three dimensional view of the two-dimensional elements from the group to form a plurality of three dimensional elements, wherein a three-dimensional element within the plurality of three-dimensional elements visually conveys information about an associated metric for resource represented by the three-dimensional element; and third displaying means, responsive to a user input interacting with the three-dimensional element, for displaying additional information regarding the three-dimensional element.

9. The data processing system of claim 8, wherein the additional information is for another metric associated with the three-dimensional element.

10. The data processing system of claim 8, wherein the user input is a movement of a pointer over the three-dimensional element and wherein the additional information is displayed as a label with text identifying a metric associated with the three-dimensional element.

11. The data processing system of claim 8, wherein the user input is a selection of the three-dimensional element and wherein the additional information is a table containing an indication.

12. The data processing system of claim 8, wherein the plurality of three-dimensional elements are a plurality of bars.

13. The data processing system of claim 8, wherein the plurality of three-dimensional elements are color coded to provide information on a selected metric.

14. A computer program product in a computer readable medium for presenting resource information, the computer program product comprising:

first instructions for displaying a set of user defined groups, wherein a user defined group within the set of user defined groups contains a set of two-dimensional elements, and each two dimensional element represents a resource in a network data processing system;

second instructions, responsive to a selection of a group from the groups of two-dimensional elements, for displaying a three dimensional view of the two-dimensional elements from the group to form a plurality of three dimensional elements, wherein a three-dimensional element within the plurality of three-dimensional elements visually conveys information about an associated metric for resource represented by the three-dimensional element; and third instructions, responsive to a user input interacting with the three-dimensional element, for displaying additional information regarding the three-dimensional element.

15. The computer program product of claim 14, wherein the additional information is for another metric associated with the three-dimensional element.

16. The computer program product of claim 14, wherein the user input is a movement of a pointer over the three-dimensional element and wherein the additional information is displayed as a label with text identifying a metric associated with the three-dimensional element.

17. The computer program product of claim 14, wherein the user input is a selection of the three-dimensional element and wherein the additional information is a table containing an indication.

18. The computer program product of claim 14, wherein the plurality of three-dimensional elements are a plurality of bars.

19. The computer program product of claim 14, wherein the plurality of three-dimensional elements are color coded to provide information on a selected metric.

* * * * *